3,472,915
**PROCESS OF PREPARING SEEMINGLY
ONE-STAGE NOVOLACS**
Stuart H. Rider, Kirkwood, Mo., assignor to Monsanto
 Company, St. Louis, Mo., a corporation of Delaware
No Drawing. Continuation-in-part of application Ser. No.
 687,978, Dec. 5, 1967. This application Oct. 18, 1968,
 Ser. No. 768,875
Int. Cl. C08g *37/18, 37/08, 51/74*
U.S. Cl. 260—839                                10 Claims

ABSTRACT OF THE DISCLOSURE

Process for producing under diluent-free conditions solid, thermosettable, seemingly one component phenolic resin particulate products of phenol-aldehyde novolac and curing agent therefor.

RELATED APPLICATION

This application is a continuation-in-part of applications, Ser. No. 411,111 and Ser. No. 411,136, both filed on Nov. 13, 1964, and both now abandoned, and of copending application Ser. No. 687,978, filed Dec. 5, 1967, now abandoned.

BACKGROUND

The art has a background of over 50 years in the manufacture of phenol-aldehyde type resins and in particular phenol-formaldehyde resins. However, in this well known art, it is believed that no one has succeeded in producing a phenol-formaldehyde novolac resin (the phenol-formaldehyde novolac being the condensation reaction product of less than one mol of formaldehyde per mol of phenol) by a process wherein the curing agent is brought into contact with molten novolac at elevated temperatures and quickly cooled wherein the resulting product is such that the curing agent is either (1) completely dissolved in the solid novolac, (2) a solid dispersion therein, or (3) partially dissolved-partially solid dispersion therein.

In the manufacture of phenol-formaldehyde resins, the art is directed to preparing two types of resin. One type of resin is called a one-stage resin and is the reaction product of more than one mol of formaldehyde per mol of phenol in the presence of an alkaline catalyst. The other type of resin is called a two-stage resin and is the reaction of less than one mol of formaldehyde per mol of phenol typically in the presence of an acid catalyst. The two-stage resin requires the addition of a curing agent, such as hexamethylenetetramine, in order to become thermoset or infusible upon exposure to elevated temperatures. The one-stage resin as produced merely requires exposure to elevated temperatures in order to become thermoset or infusible.

The one-stage resin so prepared is difficult to control in order to obtain the desired properties. Frequently, the resulting product has either undergone inadequate reaction or is overreacted causing the resin to gel or setup and become permanently infusible. As such in either case, the resin so produced is inadequate for its intended end use and can result in loss of a valuable product and operating time. Even if the resin under the most ideal conditions is satisfactorily prepared, there is great difficulty encountered in shipping and storing this type of resin. It has been known to have a tendency to cake or even advance towards the infusible state at room temperature. This again would render the one-stage resin unsatisfactory to the ultimate consumer since such caking or advancement thereof would affect the properties of the resin.

The two-stage resin requires first preparing the condensation reaction product commonly known as a novolac by reacting less than one mol of formaldehyde per mol of phenol under the proper conditions. After cooling and solidifying, the lump novolac is physically blended by grinding with a suitable quantity of the curing agent such as hexamethylenetetramine. This resin in powdered form has found extensive use in various bonding applications. However, in order to prepare a resin of this type having the desired and necessary properties for shipping, storing and bonding applications, it has been the practice through necessity to prepare a novolac having a fairly high melting point; namely, an excess of 70° C. It has been the experience, that, when preparing a novolac having a melting point of less than 65° C., such novolac when blended with a curing agent will cake and solidify during shipping or storing. The disadvantages are obvious in that further processing is necessary in order to allow the resin to thus be used. When preparing suitable and satisfactory resins which will remain stable during shipping and storing another problem is encountered; namely, segregation of the novolac and the curing agent. This is particularly troublesome in the continuing and increasing use of automatic conveying systems where great quantities of solid materials are transported by automatic conveying means. The vibration occurring during movement of the conventional powdered two-stage resin can cause the novolac and curing agent to segregate. Again, in bonding applications with such a resin, the desirable strengths and end properties are not obtained due to this non-uniformity of the product.

Therefore, it would be a great advantage to resin producers to be able to produce a phenol-aldehyde novolac resin which did not possess the drawbacks of a conventional two-stage phenol-aldehyde novolac resin and which is a seemingly one component system. By the present invention, there is provided a process for producing a solid, thermosettable, seemingly one component phenolic resin product comprising a special mixture of phenol-aldehyde novolac and curing agent therefor.

By this process, a solid seemingly one-component phenolic resin product is directly produced from a combination consisting essentially of phenol-aldehyde novolac and curing agent under diluent-free conditions (e.g. a non-solvent system) thereby avoiding prior art problems associated with diluent or liquid phase mixing conditions, such as separating a product from a liquid medium employed, e.g. water or organic liquid. In addition, by this process, the admixing of novolac with curing agent is accomplished under conditions such that little or none of the curing agent reacts with the novolac, and, at the same time, the curing agent is so intimately intermixed with the novolac that it cannot be separated therefrom by physical means.

SUMMARY

In accordance with the present invention, a phenol-aldehyde novolac resin having a melting point above about 60° C. (preferably 65° C.) at atmospheric pressures is subjected to sufficient heat and pressure to reduce the viscosity of said novolac resin to not greater than about 20,000 centipoises, and preferably not greater than about 10,000 centipoises.

The so liquified novolac resin is then uniformly admixed with a curing agent therefor. The total mixing time is chosen so as to be not more than about three minutes and preferably is not more than about 30 seconds. Usually, such admixing is continued for a period of at least about two seconds.

In this invention, uniform admixing is achieved using any conventional means, especially agitating. As employed herein, agitating includes any means which will cause mixing of the phenol-aldehyde novolac and the curing agent. This includes employing a mixing or impeller-type blade, mixing rolls, a Banbury mixer, horizontal mixing plates which would subject the materials to a shearing action, etc.

After such mixing, the resulting admixture is cooled to a temperature below about 40° C. within a total time interval of less than about one minute. Preferably, this total time interval is less than about 30 seconds. When the admixture is cooled, it immediately is solidified. Immediate cooling is necessary in order to prevent complete reaction of the curing agent with the phenol-aldehyde novolac.

The temperature of the novolac resin in any given mixing operation within the teachings of the invention is so chosen that preferably not more than about 20 weight percent of the curing agent (based on total weight of said curing agent) reacts with said novolac resin as shown, for example, by infra-red analysis. Typical upper temperatures are below about 200° C., but this value can vary depending upon starting materials and process conditions as those skilled in the art will readily appreciate.

The phenol-aldehyde novolac employed herein is the condensation reaction product of less than one mol of aldehyde per mol of phenol in the presence of an acid catalyst. This can range from 0.1-0.95 and preferably, from 0.5-0.85 mol of an aldehyde per mol of phenol. The condensation reaction is conducted in the presence of appropriate catalyst generally an acid catalyst. These catalysts are well known in the art and in fact the condensation reaction for producing the phenol-aldehyde novolac is also well known in the art. Preferably, the phenol-aldehyde employed herein is the condensation reaction product of phenol and formaldehyde. However, it is to be understood herein that the term "phenol" shall include phenol, meta-substituted phenols such as methyl, ethyl, phenyl and the like substituted phenols and mixtures thereof and mixtures of one or more of these with ortho-and/or para-substituted phenols such as paratertiary butyl phenol, ortho-methyl phenol, ortho- or para-styreneated phenols, etc. In addition, it is to be understood herein that the aldehydes to be used include formaldehyde in its various forms such as formalin (35–60% formaldehyde), paraform (91–100% formaldehyde) and other aliphatic aldehydes exemplified by acetaldehyde, propionaldehyde and the like; aromatic aldehydes exemplified by benzaldehyde; cyclic aldehydes such as furfural and the like, and mixtures of the above.

One process which may be utilized in preparing the novolac resins employed in the practice of this invention can be that process usually practiced in which phenol and an acid are added to a suitable reaction vessel and heated to about 95° C. This is followed by gradual addition of the formaldehyde to the molten phenol. The reaction mixture is raised to reflux temperature and maintained at such for a period of about 20–140 minutes depending upon the acid catalyst chosen. Dehydration of the reaction product is accomplished by allowing the water to distill.

In the practice of this invention, it may be desirable to also incorporate other materials with the phenol-aldehyde novolac and the curing agent during the preparation of the resin. This includes, for example, such materials as powdered rubber, powdered polyvinyl butyral, linseed oil, magnesium silicate, calcium carbonate, talc, clay, finely-divided asbestos fibers, waxes including both the natural and synthetic waxes, pigments having tinctorial properties and glass fibers. The amount of these fillers can vary from as low as 1% based on the weight of the resin composition to as high as 30 weight percent or higher depending upon the desired end application or use of the resin. They may be first added to the novolac during the preparation thereof or they may be added during the preparation of the resin.

In addition to the curing agent properties described above, it will be appreciated that in the practice of this invention, the curing agent can be any material which will co-react with a phenol-aldehyde novolac under the influence of heat and thereby render the resulting composition permanently infusible. Preferably, the curing agent employed herein can be hexamethylenetetramine; an epoxy compound containing the group:

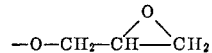

and includes such compounds as polyglycidyl esters of polybasic acids as disclosed in U.S. 2,866,767; polyglycidyl ethers of polyhydric phenols; polyglycidyl ethers of polyhydric alcohols; polyepoxides (including diepoxides); formadehde condensates of urea, guanamine, melamine and resorcinal and isocyanates; paraformaldehyde; one-stage phenol-formaldehyde resins (resins wherein more than one mol of formaldehyde is reacted per mol of phenol with an alkaline catalyst); and mixtures of the above. Other suitable curing agents are well known to those of ordinary skill in the art. (See, for example, the curing agents described in Novotny, U.S. Patent 2,156,124.) However, in the preferred practice of this invention, hexamethylenetetramine is employed as the curing agent.

Although liquid curing agents can be used in the practice of this invention, particulate solid curing agents are preferred.

Preferably, when the curing agent is such a solid, it has an average (maximum dimension) particle size of less than about 100 microns. Initially, at the time of admixing, it is more preferably, under about 44 microns in maximum average dimension.

The novel thermosetting resin compositions of this invention comprise from about 3 to 25 parts by weight of curing agent per 100 parts by weight of phenol-aldehyde novolac. It is believed that in preferred products of this invention, a minor portion (less than about 50 weight percent thereof) of the curing agent is present as a dispersion thereof in solidified phenol-aldehyde novolac with the balance of the curing agent being dissolved in the novolac. Thus, a common composition of this invention is one wherein at least about 5 percent by weight of the curing agent is present as a solid dispersion thereof in the solid phenol-aldehyde novolac with the balance of the curing agent being dissolved in the solid phenol-aldehyde novolac. The amount of the curing agent present as a solid dispersion in the solid phenol-aldehyde novolac is typically about 2 to 30 percent by weight of the total weight of curing agent present.

An important and novel feature of the instant invention is that the curing agent is present in the solid phenol-aldehyde novolac either as a substantially complete solid dispersion therein, or as a partial solid dispersion, partial dissolution therein. In either situation, the resin composition is a seemingly one-stage system with the curing agent generally encapsulated by the novolac. Typically, the curing agent cannot be separated from the novolac in a product of the invention.

The relationship between the novolac resin and the curing agent is typically such that when 100 parts by weight of a product in a finely divided form (less than about 100 microns) are dispersed in 1000 parts by weight of water for a time of at least 15 minutes not more than about 10 weight percent (based on total weight of said curing agent) is dissolved in said water.

Another surprising and unique feature of the composition of this invention, although not a limiting condition, is that there is substantially and preferably no reaction between the curing agent and the novolacs. In general, chemically not more than about 20 weight percent (based on total weight of the curing agent) is reacted with the novolac resin as shown, for example, by infrared analysis and preferably not more than about 10 weight percent. More preferably, substantially none of the curing agent is reacted with the novolac in product compositions of this invention.

This is surprising since the composition is prepared at elevated temperatures. Observe that in the "Embodiments" below, infrared spectrum analysis and nitrogen analysis both show that the curing agent is still present in a substantially unreacted form since the content of the curing agent is essentially present in the same amount as added in the preparation of the composition of this invention.

Although it is shown in the examples that there is substantially no reaction between the curing agent and the novolac, it is understood herein that some reaction between the curing agent and the novolac can occur. The question of some or partial reaction between the component parts is dependent upon the time that the component parts are in contact with each other at the elevated temperatures during preparation thereof.

In practice of the process of this invention, several types of end product compositions can be prepared. For example, a composition can be prepared wherein the curing agent is substantially completely dissolved in the phenol-aldehyde novolac. The degree of dissolution to some extent depends upon such factors as the particle size of the curing agent, the type of curing agent, and the dwelling time. A finely-divided hexamethylenetetramine having an average particle size of less than about 100 microns (and typically less than about 44 microns) with the proper mixing or dwell time of about 2–25 seconds, and preferably about 5–8 seconds, readily dissolves in a liquid phenol-aldehyde novolac. On the other hand, when hexamethylenetetramine having a larger particle size is used or a shorter mixing time is used, there results a resin composition wherein a greater portion of the curing agent is in solid form in the phenol-aldehyde novolac than when a finely divided hexamethylenetetramine is used. The balance of the curing agent is dissolved in the novolac.

A hot mixture of curing agent and novolac, as prepared according to this invention, can be simply cooled (as described above) by any convenient cooling means, as those skilled in the art will appreciate.

A preferred method of cooling involves the preparation of a flake product which is conveniently prepared by cooling using rolling or spreading of a composition while still in a heated state into a thin flat sheet on a cooled surface to a depth not greater than about one millimeter thick. The flat sheet is then immediately cooled to prevent any or complete reaction between the curing agent and the phenol-aldehyde novolac by generally continuously moving such surface (e.g. a cooled belt) in a direction away from the relative place where the fluid mixture is being deposited on such surface. As soon as it is cooled, the resulting cooled sheet is conveniently broken up into flake material wherein at least about 80 weight percent of the individual flake pieces are preferably about 25 square millimeters in surface area. Preferably, each flake is about 0.5 millimeter thick. In general, each flake has a pair of spaced generally parallel faces and has an average maximum dimension at least five times average minimum dimension. Of course, the size stated herein is not a critical limitation and can vary depending upon the rolling operation.

Although it is preferred to produce a product composition having essentially no reaction between the curing agent and the phenol-aldehyde novolac, a partially but uncompletely reacted composition can be prepared depending upon the mixing time of the reactants. Generally, the longer the dwell or mixing time and/or the higher the temperature, the greater is the possibility of part of the curing agent reacting with the phenol-aldehyde novolac.

EMBODIMENTS

The following examples are set forth to illustrate more clearly the principles and practices of this invention to one skilled in the art and they are not intended to be restrictive but merely to be illustrative of the invention herein contained. Unless otherwise stated, all parts and percentages are on a weight basis.

EXAMPLE I

Part A

A condensation reaction product of phenol and formaldehyde is prepared in a vacuum kettle by reacting about 0.75 mol formaldehyde per mol of phenol in the presence of an acid catalyst (sulfuric acid). After dehydration, the highly viscous phenol-formaldehyde novolac is found to have a melting point of about 70 to 75° C. While this novolac is at a temperature of about 120° C. it is fed into a heated mixer having a mixing chamber of about 2½" in diameter and open at the bottom thereof. The mixer is affixed with an impeller-type blade so as to impart a shearing action to the molten phenol-formaldehyde novolac. The resulting so treated novolac has a viscosity of about 12,000 to 16,000 centipoises. Simultaneously therewith finely-divided hexamethylenetetramine having an average particle size of less than about 80 microns is fed into the mixer at a rate of about 14 parts thereof per 100 parts of the liquid novolac under agitation. The solid hexamethylenetetramine is brought into contact with the novolac at the point where the impeller-type blade imparts a shearing action to the novolac. The actual contact mixing time is about 10 seconds. The resin is then solidified by quickly cooling (in less than about one minute) to room temperature by exposure of the product resin to air or preferably on a cooled surface to remove heat.

Alternatively, the hexamethylenetetramine is typically less than about 44 microns in size. Also alternatively, the cooling is accomplished by spreading the product mixture on a cooling belt (such as a so-called Sandvik Belt Cooler) in a time of less than about 30 seconds.

Part B

A sample of the resin so produced in Part A above is submitted to X-ray diffraction analysis. As control samvolac resins containing 2, 4, 8 and 14 parts of hexamethylenetetramine, respectively, are prepared wherein solid hexamethylenetetramine is merely physically blended with a solid phenol-formaldehyde novolac which is the reaction product of 0.75 mol of formaldehyde per mol of phenol.

Briefly, X-ray diffraction is a method of determining the presence of a crystalline structure in a given material. In the samples submitted to X-ray diffraction, the presence of crystals of hexamethylenetetramine will cause diffraction of the X-ray beam while amorphous materials will cause scattering of the X-ray beam. A measure of the relative amounts of these component parts is given by the ratio of the intensity of (a) the diffraction of the crystalline hexamethylenetetramine to (b) the intensity of the scattering halo of the X-ray beam from the amorphous materials. The amorphous substance in these samples is essentially the phenol-formaldehyde novolac. The higher the ratio of intensities, the greater is the amount of crystalline hexamethylenetetramine in the sample being analyzed.

The following results are obtained upon an analysis of the control samples and the resin prepared in Part A above:

| Sample: | Ratio of intensities based on X-ray diffraction |
|---|---|
| Part A | 0.152 |
| Control (2 parts) | 0.250 |
| Control (4 parts) | 0.545 |
| Control (8 parts) | 1.038 |
| Control (14 parts) | 1.700 |

From the above results, X-ray diffraction has demonstrated that some crystalline hexamethylenetetramine is still present in the resin prepared in Part A. The balance of the hexamethylenetetramine present in the sample of Part A is in solution in the novolac.

Part C

The resin prepared in Part A above is analyzed for hexamethylenetetramine content. Samples of the resin so prepared in Part A above are separately analyzed by infrared spectrum analysis and by the Kjeldahl method for nitrogen determination which requires caustic digestion, distillation and titration of ammonia and from which can be calculated the parts of hexamethylenetetramine. The analysis of two separate samples based on 14 parts of hexamethylenetetramine per 100 parts of novolac is as follows:

Infrared analysis: 14.0; 13.9
Nitrogen analysis: 13.8; 13.8

The results of the analysis, within the degree of accuracy in the test methods, show that there is essentially no reaction between the phenol-formaldehyde novolac and the hexamethylenetetramine even though the resin composition is prepared at elevated temperatures.

EXAMPLE II

Example I, Part A, is repeated except that the average particle size of the hexamethylenetetramine is about 150 microns and the contact or mixing time is about 8 seconds. The resin is quickly cooled and a sample thereof is analyzed by X-ray diffraction for the presence of crystalline hexamethylenetetramine. The ratio of intensities of the sample submitted to X-ray diffraction is less than about 1.7. This indicates that the sample so produced is a solid solid dispersion of crystalline hexamethylenetetramine in the novolac.

EXAMPLE III

Example I, Part A, is repeated except that the hexamethylenetetramine has an average particle size of about 80 microns and the time of agitation or mixing is about 3 seconds.

A sample of the resin so produced is analyzed for crystalline hexamethylenetetramine by X-ray diffraction and for hexamethylenetetramine content by infrared analysis. The results are as follows:

Ratio of intensities based on X-ray diffraction: less than about 1.7
Hexamethylenetetramine infrared analysis: 14.0 parts per 100 parts of novolac The above analysis shows the curing agent is present in substantially crystalline form with substantially no reaction between the novolac and the curing agent.

The resin of this example is a solid solid dispersion of the curing agent in the novolac.

EXAMPLE IV

The physical properties of the resins prepared in Example I, Part A and Example III are compared with the properties of a standard blend of solid phenol-formaldehyde novolac and solid hexamethylenetetramine. The phenol-formaldehyde novolac employed to prepare this standard blend is the condensation reaction product of 0.75 mol of formaldehyde per mol of phenol employing an acid catalyst. The results are as follows:

| | Example I, part A | Example II | Standard [4] |
|---|---|---|---|
| Melting point,[1] °C | 81 | 81 | 74 |
| Flow in mm.[2] | 83 | 84 | 86 |
| Hot plate cure,[3] sec | 120 | 115 | 115 |

[1] Melting point is that temperature in degrees centigrade at which the resin begins to adhere to the surface of a heated metal bar having a graduated temperature over the length of the bar.
[2] Flow is determined by the inclined plate method wherein a given sample of the resin is placed on a glass plate in a heated oven at 125° C. The plate is inclined at a given angle. The flow of the sample is measured in millimeters.
[3] Hot plate cure is the time in seconds it takes for a given resin sample to cure or become permanently infusible when stroked on a heated metal surface at a temperature of about 150°C.
[4] In this instance, the phenol-formaldehyde novolac is prepared as described in Example I except that the hexamethylenetetramine and the dry novolac are co-ground and blended at room temperature in a grinder mixer.

These results show that the melting point of a resin product of this invention has a higher melting point than a conventional resin formulation containing the same amount of hexamethylenetetramine blended in the conventional fashion. Such differences in melting point are significant in that in commerce the product of this invention maintains its particle integrity under conditions of prolonged storage without lumping or aggregating.

EXAMPLE V

Example I, Part A, is repeated except that a finely-divided diepoxide reaction product of two mols epichlorohydrin and one mol bis-phenol A is employed as the curing agent to prepare a resin of this invention. As determined, for example, by infra-red analysis, the resulting resin is a solution and dispersion mixture of the diepoxide in the novolac.

EXAMPLE VI

Example I, Part A, is repeated except that in place of the hexamethylenetetramine, a finely-divided melamine-formaldehyde resin is employed as the curing agent herein. The melamine-formaldehyde is prepared by the condensation reaction of about 3 mols of formaldehyde per mol of melamine. The resulting product is a solid dispersion of the melamine-formaldehyde in the phenol-formaldehyde novolac.

EXAMPLE VII

Example I, Part A, is repeated except that as the liquid composition leaves the bottom of the mixture, it is rolled into a thin flat sheet while still in the molten state. The rolling is accomplished on a cooling belt (such as a so-called Sandvik Belt Cooler in a time of less than about 30 seconds). The sheet is then cooled rapidly to room temperature to form individual "flakes" of the resin. The "flakes" so formed are about 25 square millimeters and about 0.5 millimeter thick.

EXAMPLE VIII

Example I, Part A, is repeated except that in place of the hexamethylenetetramine, a previously prepared one-stage phenolformaldehyde resin is employed as the curing agent. This previously prepared resin is prepared by condensing phenol and formaldehyde in a vacuum kettle by reacting 1.2 mols of formaldehyde per mol of phenol in the presence of calcium hydroxide.

EXAMPLES IX–XIV

Using an apparatus and operative procedure such as described in Example I (about), each of a variety of different novolac resins are admixed with different respective ones of a variety of curing agents to practice the process of the present invention with various different starting materials and various different process conditions to produce a thermosettable flake product. The individual starting materials, and the respective process conditions used therewith, in each instance, are as recorded in Table I below. Each product so made is thermosettable, as shown by conducting a stroke-cure test thereon by depositing of 0.2 to 0.5 gram sample of each product on a hot plate at 135° C. and stroking same with a spatula to determine thermosettability.

Also, each product so made, when examined optically under high magnification contains substantially no free curing agent, indicating that the curing agent in each instance is either dissolved in, or encapsulated by, the novolac.

accomplished within a total time interval of less than about 30 seconds.

5. The process of claim 1 wherein from about 3 to 25 parts by weight of said curing agent are admixed with each 100 parts by weight of said novolac resin.

6. The process of claim 1 wherein said curing agent is hexamethylenetetramine.

7. The process of claim 1 wherein said curing agent is a previously prepared one-stage phenol-formaldehyde resin.

8. The process of claim 1 wherein said curing agent is a previously prepared melamine-formaldehyde resin.

9. The process of claim 1 wherein substantially none of said curing agent reacts with said novolac resin.

10. The process of claim 1 wherein said curing agent is a particulate solid.

TABLE I

| Ex. No. | Novolac | | | | | | Curing agents | | Process times | |
|---|---|---|---|---|---|---|---|---|---|---|
| | Ratio,[1] F/P | Catalyst[2] | M.P.,° C.[3] | P.B.W.[4] | Temp., ° C.[5] | Viscosity (cps.)[6] | Type | P.B.W.[7] | Times,[8] secs. | Time,[9] secs. |
| IX-A | 0.70 | H₂SO₄ | 60-65 | 100 | 120 | 3-5K | Hexa[10] | 4 | 40 | 20-100 |
| IX-B | 0.70 | H₂SO₄ | 60-65 | 100 | 120 | 3-5K | do | 30 | 3 | 20-100 |
| IX-C | 0.70 | H₂SO₄ | 60-65 | 100 | 120 | 3-5K | do | 51 | 10 | 20-100 |
| IX-D | 0.70 | H₂SO₄ | 60-65 | 100 | 120 | 3-5K | do | 4 | 5 | 20-100 |
| X-A | 0.70 | Oxalic acid | 60-65 | 100 | 120 | 3-5K | do | 20 | 10 | 20-100 |
| | 0.70 | Oxalic acid | 60-65 | 100 | 120 | 3-5K | do | 6 | 60 | 20-100 |
| | 0.70 | Oxalic acid | 60-65 | 100 | 120 | 3-5K | do | 11 | 7 | 20-100 |
| XI-A | 0.72 | Oxalic acid | 67-72 | 100 | 125 | 3-5K | MF[11] | 5 | 15 | 20-100 |
| XI-B | 0.72 | Oxalic acid | 67-72 | 100 | 125 | 3-5K | MF | 15 | 3 | 20-100 |
| XI-C | 0.72 | Oxalic acid | 67-72 | 100 | 125 | 3-5K | PF[12] | 10 | 10 | 20-100 |
| | | | | | | | | 40 | 10 | |
| XI-D | 0.72 | Oxalic acid | 67-72 | 100 | 125 | 3-5K | UF[13] | 7 | 10 | 20-100 |
| XI-E | 0.72 | Oxalic acid | 67-72 | 100 | 125 | 3-5K | EPON 1001[14] | 20 | 15 | 20-100 |
| XII | 0.75 | H₂SO₄ | 75-85 | 100 | 120 | 12-16K | Hexa | 10-15 | 3-15 | 20-80 |
| XIII | 0.75 | Oxalic acid | | | 130 | 4-6K | do | 10-15 | 5-25 | 20-80 |
| XIV | 0.78 | H₂SO₄ | 88-98 | 100 | 130 | 10-15K | do | 10-15 | 3-15 | 15-50 |
| | 0.78 | H₂SO₄ | 88-98 | 100 | 140 | 4-7K | do | 10-15 | 5-75 | 20-60 |

[1] F/P designates formaldehyde to phenol mol ratio.
[2] Catalyst designates catalyst used in the preparation of the novolac.
[3] M.P., ° C., designates melting point of novolac.
[4] P.B.W. designates parts by weight novolac in total composition.
[5] Temp., ° C., designates temperature of the novolac at the time of mixing with curing agent.
[6] Viscosity (cps.) designates viscosity of the novolac at the time of mixing with curing agent.
[7] P.B.W. designates parts by weight curing agent in total composition.
[8] Time, secs. designates mixing time.
[9] Time, secs., designates quench time after mixing (the time required to cool a product to substantially room temperature conditions).
[10] Hexa designates an abbreviation for hexamethylenetetramine.
[11] MF designates an abbreviation for melamine-formaldehyde. This resin has a formaldehyde mol ratio of 2.5:1 and is made using caustic as the catalyst.
[12] PF designates an abbreviation for phenol-formaldehyde. This resin is a one-stage phenolic resin having a formaldehyde to phenol mol ratio of about 1.8:1.
[13] UF designates an abbreviation for urea-formaldehyde. This resin has a weight ratio of 50% formalin to urea of 105:65 and is available from the Monsanto Company under the trade designation UF-71.
[14] EPON 1001 designates a trade mark and product of the Shell Chemical Corporation chemically comprising a poly (diglycidyl ether) of bisphenol A.

What is claimed is:

1. In a process for admixing a combination consisting essentially of a dehydrated phenol-aldehyde novolac resin with a dehydrated curing agent therefore under substantially diluent-free conditions so as to prepare a solid, thermosettable, seemingly one component product, the improvement which comprises the steps of:
   (a) subjecting a novolac resin having a melting point above about 60° C. to elevated heat and pressure to liquify and reduce the viscosity of said novolac resin to not greater than about 20,000 centipoises,
   (b) uniformly admixing with such resulting novolac resin within a total time interval of not more than about three minutes a curing agent therefor, said curing agent being substantially non-volatile at room temperatures and atmospheric pressures, and
   (c) thereafter cooling the resulting admixture to a temperature below about 40° C. at atmospheric pressures within a total time interval of less than about one minute.

2. The process of claim 1 wherein said cooling is accomplished by spreading said resulting admixture upon a cooled surface to a depth initially not greater than about one millimeter thick, said surface being moved generally continuously relative to the location of said spreading in a direction away therefrom, the so-cooled product thereafter being collected from said surface, thereby to prepare the desired solid thermosettable, seemingly one component product in flake form.

3. The process of claim 1 wherein said admixing is accomplished within a total time interval of less than about 30 seconds.

4. The process of claim 1 wherein said cooling is

References Cited

UNITED STATES PATENTS

| 1,046,420 | 12/1912 | Aylsworth | 260—59 |
| 1,242,592 | 10/1917 | Redman et al. | 260—57 |
| 1,418,718 | 6/1922 | Kendall | 260—57 |
| 2,156,124 | 4/1939 | Novotny | 260—34 |
| 2,168,981 | 8/1939 | Flood et al. | 260—60 |
| 2,475,587 | 7/1949 | Bender et al. | 260—57 |
| 2,387,256 | 10/1945 | Groten | 260—839 |
| 2,674,589 | 4/1954 | Coleman et al. | 260—57 |
| 2,714,098 | 7/1955 | Martin | 260—38 |
| 3,020,254 | 2/1962 | Less et al. | 260—38 |
| 3,220,172 | 8/1965 | Renner | 260—831 |

OTHER REFERENCES

Synthetic Resins and Rubbers, Powers, 1943, pp. 69–72.
Technology of Plastics and Resins, Mason et al. 1945, pp. 170–174.
Chemistry of Phenolic Resins, Martin, 1956, p. 112.
Chemistry of Synthetic Resins, Ellis, vol. 2, 1935, pp. 1284–88.
Journal of Colloid Science, vol. 5, 1950, Guzzetti et al. pp. 202–207.
Phenolic Resins, Gould, 1959, pp. 61–62.

WILLIAM H. SHORT, Primary Examiner

HOWARD SCHAIN, Assistant Examiner

U.S. Cl. X.R.

260—3, 19, 25, 28, 38, 51, 53, 55, 56, 69, 831, 838, 840